US011940973B1

(12) United States Patent
Moussaffi et al.

(10) Patent No.: US 11,940,973 B1
(45) Date of Patent: Mar. 26, 2024

(54) LIMITING CONCURRENT DATABASE UPDATES (71) Applicant: monday.com Ltd., Tel Aviv (IL)

(72) Inventors: Eviathar Moussaffi, Tel Aviv (IL); Omer Doron, Tel Aviv (IL); Dor Yehuda, Hod Hasharon (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 18/091,477

(22) Filed: Dec. 30, 2022

(51) Int. Cl.
H04L 9/00 (2022.01)
G06F 16/23 (2019.01)

(52) U.S. Cl.
CPC .................. G06F 16/2308 (2019.01)

(58) Field of Classification Search
None
See application file for complete search history.

(56) References Cited

U.S. PATENT DOCUMENTS 7,590,076 B2 * 9/2009 Sumino .............. H04L 45/02
370/395.31
10,929,226 B1 * 2/2021 Miller .............. G06F 12/0253

FOREIGN PATENT DOCUMENTS

CN 105594155 A * 5/2016 .......... B60R 16/023

OTHER PUBLICATIONS

Golam Mostaeen, Dec. 2018. Towards Collaborative Scientific Workflow Management System.*

* cited by examiner

Primary Examiner — Tuankhanh D Phan (57) ABSTRACT

Disclosed herein is a method of limiting concurrent updates in a database, comprising adapting each of plurality of computing devices executing one or more applications capable of updating data in one or more databases accessible by a plurality of applications to execute a DB update limiter. The DP update limiter is configured for each update access of the one or more applications to the database(s), identify a DB segment identifier of a destination segment of the database targeted by the respective update access, check an access counter associated with the identified DB segment identifier which is indicative of a number of update accesses currently in progress to the destination segment, enable the respective update access responsive to determining that the access counter is smaller than a certain threshold, and prevent the respective update access responsive to determining that the access counter equals the certain threshold.

18 Claims, 5 Drawing Sheets

LIMITING CONCURRENT DATABASE UPDATES

FIELD AND BACKGROUND OF THE INVENTION

The present invention, in some embodiments thereof, relates to limiting concurrent updates in a database and, more specifically, but not exclusively, to limiting concurrent updates in a database at application level using access counters shared by all applications accessing the database.

Databases are fundamental building blocks in modern information and data based technology as practically every application, service, platform and system relies on data collection, access, retrieval and logging.

Robustness, reliability, efficiency of the databases in terms of functionality and/or performance is therefore a major concern which is ever coupled with the need to ensure integrity, consistency, security and often privacy of the data stored in the databases.

SUMMARY OF THE INVENTION

According to a first aspect of the present invention there is provided a method of limiting concurrent updates in a database, comprising using one or more processors of each computing device executing one or more applications capable of updating data in one or more databases accessible by a plurality of applications executed by a plurality of computing devices. The one or more processors are adapted for executing a DB update limiter configured for executing the following for each update access of the one or more applications to the one or more databases: identifying a DB segment identifier of a destination segment of the database targeted by the respective update access, checking an access counter associated with the identified DB segment identifier, the counter is indicative of a number of update accesses currently in progress to the destination segment, enabling the respective update access responsive to determining that the access counter is smaller than a certain threshold, and preventing the respective update access responsive to determining that the access counter equals the certain threshold.

According to a second aspect of the present invention there is provided a system for limiting concurrent updates in a database, comprising one or more processor of each computing device executing one or more application capable of updating data in one or more database accessible by a plurality of applications executed by a plurality of computing devices, the one or more processor is adapted for executing a program code of a DB update limiter. The program code comprising code instructions to execute the following for each update access of the one or more application to the one or more database: identify a DB segment identifier of a destination segment of the database targeted by the respective update access, check an access counter associated with the identified DB segment identifier, the counter is indicative of a number of update accesses currently in progress to the destination segment, enable the respective update access responsive to determining that the access counter is smaller than a certain threshold, and prevent the respective update access responsive to determining that the access counter equals the certain threshold.

In a further implementation form of the first, and/or second aspects, the DB update limiter is configured to increment the access counter in case the respective update access is enabled and decrementing the access counter after the respective update access completes.

In a further implementation form of the first, and/or second aspects, the DB update limiter is configured to increment and decrement the access counter every certain number of enabled update accesses to the associated segment.

In a further implementation form of the first, and/or second aspects, the certain number is selected according to a probability rate indicating a frequency of incrementing and subsequently decrementing the access counter for a group of update accesses.

In a further implementation form of the first, and/or second aspects, the DB update limiter is configured to decrement the access counter after completion of a transaction comprising the respective update access.

In an optional implementation form of the first, and/or second aspects, the DB update limiter is further configured to return an error in case the respective update access is blocked.

In a further implementation form of the first, and/or second aspects, the DB update limiter executed by the computing device is hooked to each application executed by the computing device which is capable of updating the one or more databases.

In a further implementation form of the first, and/or second aspects, the DB update limiter is embedded in each of the plurality of applications capable of updating the one or more databases.

In a further implementation form of the first, and/or second aspects, the access counter is stored in one or more shared memory resources accessible to the DB update limiter executed by each of the plurality of computing devices executing application capable of updating the one or more databases.

In an optional implementation form of the first, and/or second aspects, the certain threshold is adjusted according to one or more parameters of the computing device, the one or more applications, and/or a user of the computing device.

In a further implementation form of the first, and/or second aspects, each segment of the database comprises one or more members of a group consisting of: a table, a row, an entry, a cell, a field, a key, a primary key, a table, and the entire one or more databases.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to limiting concurrent updates in a database and, more specifically, but not exclusively, to limiting concurrent updates in a database at application level using access counters shared by all applications accessing the database.

Databases, for example, relational database, Standard Query Language (SQL) database, NoSQL database, NewSQL database, and/or the like which may comprise one or more datasets, for example, a table that includes large numbers (e.g., thousands, tens of thousands, hundreds of thousands, or more) of rows and/or columns may be typically accessed by a plurality of disparate applications which are not synchronized with each other and may be typically executed by a plurality of different computing devices.

As such, multiple applications may concurrently attempt to update data at the location in the database at the same time. Such concurrent update, if not correctly handled, may compromise data stored in the database since concurrent update may which lead to data corruption, data loss and/or the like.

Therefore, in order to ensure data integrity, consistency and/or reliability of their contents in multi-application and/or multi-user environments, databases and/or their Database Management Systems (DBMS) may typically employ locking mechanism configured to lock database segments which are being updated and prevent other applications from accessing the locked segments.

The size, structure, and/or scope of the lockable segments may depend on one or more operational parameters of each database and may therefore vary from between databases. Such lockable segments which may be also regarded as Units of Recovery (UR) may comprise, for example, rows, entries, cells, fields, keys, primary keys, tables, and even the entre database.

However, the number of update accesses initiated in attempt to concurrently update the same database segment at the same time may become significantly large in some database systems thus significantly overloading the locking mechanism(s) applied to lock the accessed segments and prevent concurrent updates.

Overloading the locking mechanism(s) applied to protect the database(s) may lead to major degradation of performance of the database in terms of latency, application lock, deadlocks and/or the like. In extreme cases, the locking mechanism overload may cause corruption and/or loss of data in the database and may even result in no response and/or crash of the database.

According to some embodiments of the present invention, there are provided methods, systems and computer program products for limiting the number of concurrent update accesses conducted to each segment in databases comprising large datasets, for example, one or more tables each comprising a plurality of cells typically arranged in rows and/or columns.

In particular, the number of concurrent update accesses to each segment of the database is limited at the application level of the multi-user computing environment by deploying update access limitation means, mechanisms, and/or provisions in the applications accessing and updating the database.

Each of the segments of the database may be associated with a respective access counter indicative of the number of update accesses which are currently in progress to the respective segment. As described herein after in detail, the counter associated with one or more of the segments may accurately reflect the exact number of update accesses currently in progress to the respective segment. However, the counter associated with one or more of the segments may optionally indicate a scope, volume, and/or order of magnitude of update accesses which are currently in progress to the respective segment rather than an accurate number.

Before accessing a segment of the database, each application may first read the value stored in the access counter associated with the accessed segment to check whether the access counter value exceeds a certain threshold value defined for the respective segment. In case the access counter does not exceed and/or is smaller than the certain threshold, the application may proceed to execute the update access to the segment. However, in case the access counter equals and/or exceeds the certain threshold, the application's update access to the segment may be prevented (blocked).

Moreover, in case the access counter associated with the accessed segment does not exceed and/or is smaller than the certain threshold and the update access is enabled (approved) for the application, the associated access counter may be incremented.

After completion of the update access, the associated access counter may be decremented. However, typically update accesses are part of database transactions which may comprise multiple update accesses to the same database segment. Therefore, the associated access counter may not be decremented following each update access but rather after completion of the transaction comprising the update access, i.e., upon commit, roll-back and/or abort of the transaction.

This means that in case the access counter associated with the accessed segment does not exceed the certain threshold, the access counter will be incremented prior to execution of a database transaction by an application and decremented after the transaction completes without updating the access counter for each update access included in the transaction.

Optionally, the access counter associated with one or more of the segments may be updated statistically, i.e., every certain number of update accesses to the same database segment, for example, every 10, 15, 30, consecutive update accesses and/or the like.

Optionally, the certain number defined for updating the counters associated with one or more of the segments is selected randomly.

Optionally, the certain number defined for updating the counters associated with one or more of the segments is selected randomly. For example, the certain number may be selected according to a probability rate indicating a frequency of updating the access counter associated with the destination segment, i.e., incrementing and subsequently decrementing it, for a group of update accesses. For example, the probability rate may define that the access counter should be updated during 1 in 5 of update accesses, during 1 in 10 of update accesses, during 1 in 100 of update accesses, and/or the like. In another example, the random certain number may be selected using one or more random number generators, for example, a pseudo-random number generator. in another example, the random certain number may be selected using one or more random number generators, for example, a pseudo-random number generator.

The certain threshold used to determine whether update accesses should be enabled or prevented (blocked) may be defined, selected, adjusted, and/or adapted according to one or more operational parameters of the database. For example, the certain threshold may be set according to locking mechanism capabilities of the database, i.e., how many concurrent update accesses to the same segments can the database's locking mechanism congest and/or endure before functionality of the database is degraded and/or lost at least partially. In another example, the certain threshold may be set according to an architecture of the database, its size, a number of segments in the database and/or the like.

Optionally, the certain threshold may be adjusted according to one or more database traffic and/or access characteristics identified in real-time, for example, an overall number of concurrent update accesses to the database at a given time, and/or the like. The certain threshold may be further adjusted according to one or more attributes and/or parameters relating to one or more of the computing devices, to users using the computing devices, applications accessing the database, accounts associated with the accessing applications and/or the like.

In order to ensure that all applications can access the access counters associated with all segments of the database, the access counters may be stored in a shared memory that is accessible for read and write operations to all the computing devices executing applications capable of accessing and updating the database. The shared memory may be optionally implemented using one or more messaging tools, applications, infrastructures, and/or the like configured to enable handshaking and/or data exchange between applications, for example, Redis, and/or the like.

Limiting the number of concurrent update accesses to databases at the application level may present significant benefits and advantages.

First, limiting the number of concurrent update accesses to any segment of the database may prevent overload of the database's locking mechanism which may therefore significantly increase reliability, and robustness of the database since database functionality deterioration and even loss due to such overload may be significantly reduced and potentially completely prevented. In particular, since the counters are segment oriented, excessive update accesses to specific segments may be prevented thus increasing robustness and immunity of the database to crushes due to overload while other segments of the database which are less accessed may be still available and enabled for additional update accesses.

Moreover, selecting and/or adjusting the certain threshold according to the operational parameters of each database may enable an efficient tradeoff between enabling a maximal number of concurrent update accesses thus reducing latency and/or access time for the accessing applications and ensuring that the database maintains full functionality.

Furthermore, adjusting the certain threshold according to parameters of the accessing applications, their executing computing devices, their users, their accounts and/or the accessing application may enable significant flexibility and/or selectivity in the database service per application, per user, per account and/or the like which may be achieved by dynamically adjusting the certain threshold. For example, the certain threshold may be increased for segments accessed by higher priority applications (e.g. subscribed users, premium accounts, etc.) such that blocking of update accesses to these segments is reduced thus maintaining and/or reducing access time and/or latency to these segments. On the other hand, the certain threshold may be reduced for segments accessed by lower priority applications such that blocking of update accesses to these segments may increase thus potentially increasing access time and/or latency to these segments. In another example, some users may be blocked from accessing one or more specific segments of the database but may still access other segments.

In addition, limiting the concurrent updates is done at the application level, thus eliminating the need for modification of the databases. As such, there is jo need to alter, adjust, adapt and/or modify existing databases to apply the concurrent update limitation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
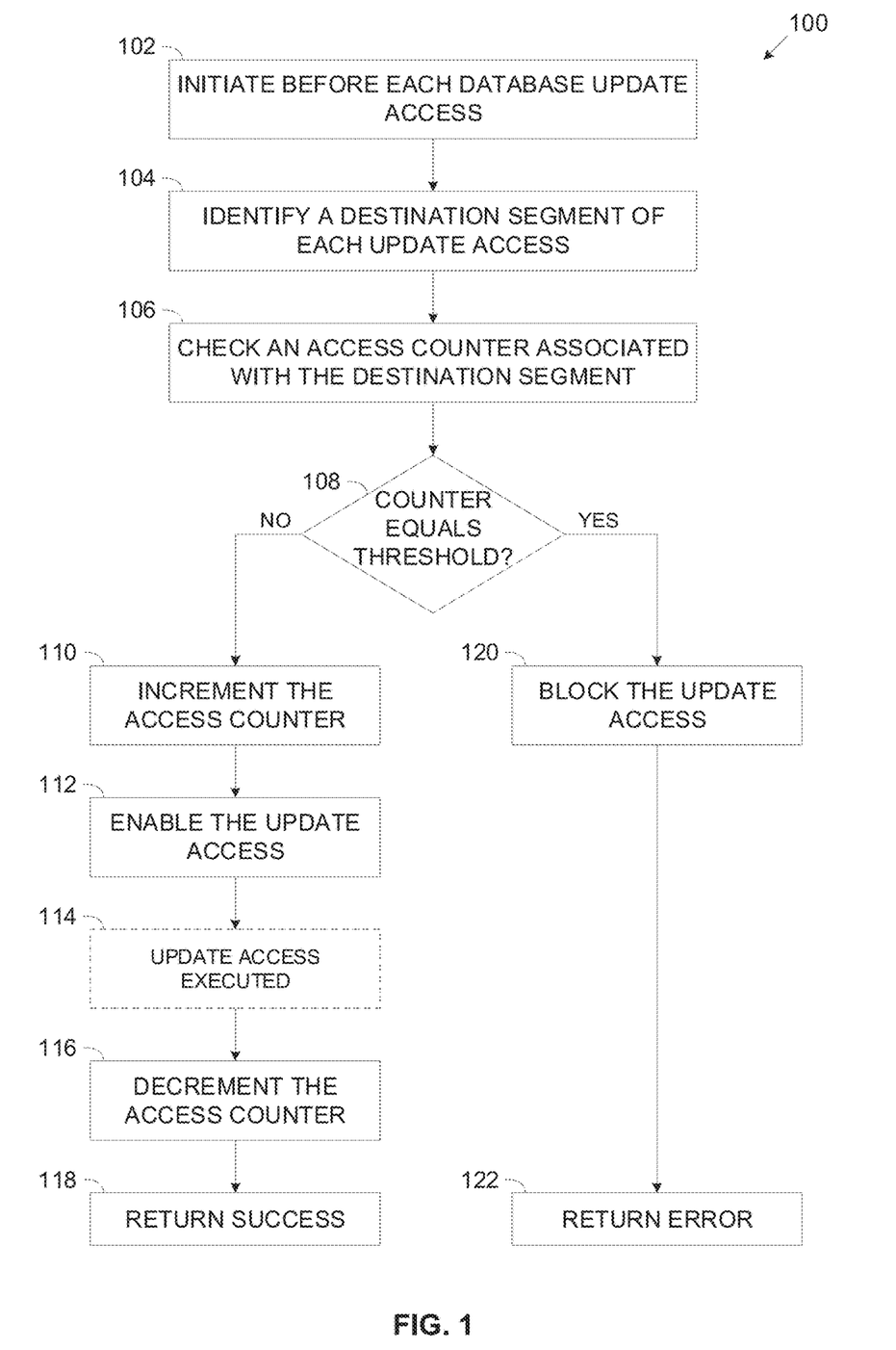
FIG. 1 is a flowchart of an exemplary process of limiting concurrent updates in a database, according to some embodiments of the present invention.

Referring now to the drawings, FIG. 1 is a flowchart of an exemplary process of limiting concurrent updates in a database, according to some embodiments of the present invention.

An exemplary process 100 may be executed to limit a number of concurrent update accesses conducted in one or more databases by a plurality of applications executed by one or more computing devices.

In order to ensure data integrity, consistency and/or reliability of their contents in multi-user environments, databases typically employ locking mechanism configured to lock database segments which are being updated and prevent other update accesses from accessing the locked segments.

There may be scenarios in which a significantly large number of update accesses may attempt to concurrently update the same database segment at the same time. Due to the locking mechanism, extensive concurrent accesses may lead to major degradation of performance of the database in terms of latency, application lock, deadlocks and/or the like. Moreover, applying the locking mechanism for extremely large numbers of concurrent accesses may lead to loss of data in the database, no response from the database and in severe cases even database crash.

In order to prevent overloading the database locking mechanism, concurrent update accesses may be therefore limited at the application level rather than at the database level.

To this end counters may be associated with segments of the database and updated upon each update access to the associated segment. Each application accessing the database to update a segment may first check the associated counter and proceed to update the segment in the database only if the counter is below a certain threshold value. Otherwise the update access may be blocked, and optionally retried until the counter drops below the threshold and then carried out.

Figure 2:
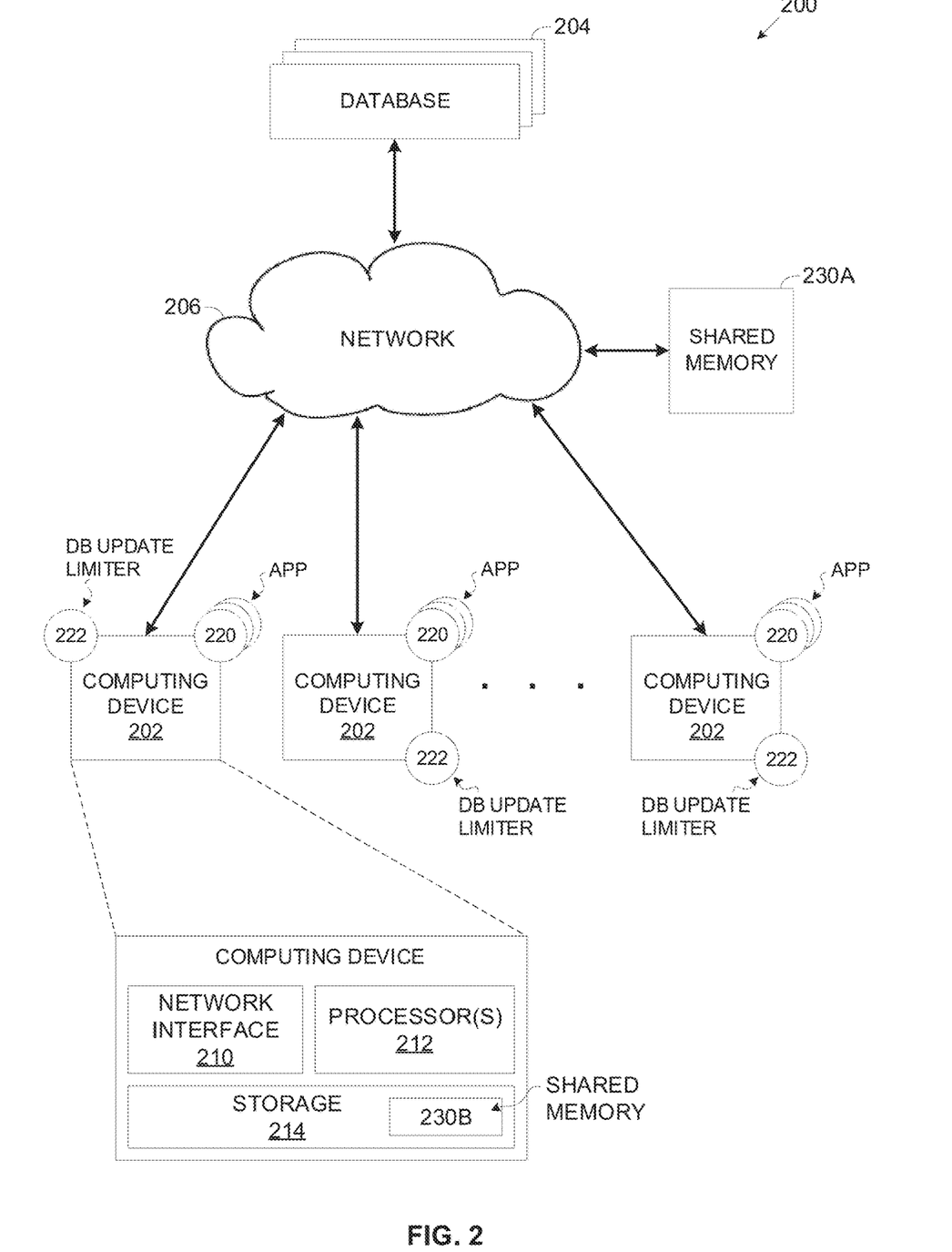
FIG. 2 is a schematic illustration of a system for limiting concurrent updates in a database, according to some embodiments of the present invention.

Reference is also made to FIG. 2, which is a schematic illustration of a system for limiting concurrent updates in a database, according to some embodiments of the present invention.

An exemplary multi-user computing environment 200 may comprise a plurality of computing devices 202, for example, a server, a computing node, a cluster of computing nodes, a desktop computer, a laptop computer, a Smartphone, a tablet, a proprietary client device and/or any device comprising one or more processors that may access one or more databases 204 and update data stored in the database(s) 204.

Each database 204 may comprise one or more datasets organized in one or more data structures, for example, a table, and/or the like. A table or tablature as used herein, refers to data presented in horizontal and vertical rows, (e.g., horizontal rows and vertical columns) defining cells in which data is presented. While a table view may be one way to present and manage the data contained on a board, a table's or board's data may be presented in different ways. For example, in some embodiments, dashboards may be utilized to present or summarize data derived from one or more boards.

The database(s) 204 which may be typically controlled by one or more Database Management Systems (DBMS) may employ one or more access and/or storage architectures, for example, relational database, SQL database, NoSQL database, NewSQL database, and/or the like.

The computing device(s) 202 may typically access the database(s) 204 via a network 206 comparing one or more wired and/or wireless networks, for example, Local Area Network (LAN), Wireless LAN (WLAN, e.g. Wi-Fi), Wide Area Network (WAN), Metropolitan Area Network (MAN), cellular network, the internet and/or the like.

Each computing device 202 may comprise a network interface 210 for connection to the network 206, a processor(s) 212, and a storage 214 for storing data and/or code (program store).

The network interface 210 may include one or more network interfaces, adapters, ports and/or links implemented via hardware, software, firmware and/or a combination thereof for connecting the respective client device 202 to the network 206. Via its network interface 210 each of the computing devices 202 may therefore access one or more of the database(s) 204 over the network 206.

The processor(s) 212, homogenous or heterogeneous, may include one or more processing nodes and/or cores arranged for parallel processing, as clusters and/or as one or more multi core processor(s). The storage 214 may include one or more non-transitory persistent storage devices, for example, a Read Only Memory (ROM), a Flash array, a Solid State Drive (SSD), a hard drive (HDD) and/or the like. The storage 214 may also include one or more volatile devices, for example, a Random Access Memory (RAM) component, a cache and/or the like. The storage 214 may further comprise one or more local and/or remote network storage resources, for example, a storage server, a Network Attached Storage (NAS), a network drive, a cloud storage service and/or the like accessible via the network interface 210.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212.

Optionally, the processor(s) 212 may include, utilize and/or apply one or more hardware elements available in the respective computing device 202, for example, a circuit, a component, an Integrated Circuit (IC), a Field Programmable Gate Array (FPGA), an Application Specific Integrated Circuit (ASIC), a Digital Signals Processor (DSP), a Graphic Processing Unit (GPU), an Artificial Intelligence (AI) accelerator and/or the like.

The processor(s) 212 may therefore execute one or more functional modules utilized by one or more software modules, one or more of the hardware modules and/or a combination thereof. In particular, the processor(s) 212 of one or more of the computing devices 202 may execute one or more applications 220 which are capable of accessing one or more of the database(s) 204 and update data stored in the database(s) 204.

The processor(s) 212 of each computing device 202 executing applications 220 capable of accessing and updating the database(s) 204 may further execute an instance of a database (DB) update limiter 222 configured to limit the number of concurrent update accesses to the database(s) 204 and/or one or more of their segments.

The DB update limiter 222 may comprise a code segment, for example, an application, a process, a plug-in, a script and/or the like which may be hooked, as known in the art, to each application 220 capable of accessing and updating the database(s) 204. However, optionally, the DB update limiter 222 may be embedded and/or integrated in one or more of the applications 220.

As described herein after in detail, in order to control the number of concurrent update access in the database(s) 204, the DB update limiter 222 may check counters stored in one or more shared memory resources 230, interchangeably designated shared memory 230, which are accessible to the DB update limiter 222 executed by all computing devices 202.

The shared memory 230 may be implemented, deployed and/or facilitated using one or more resources, architectures and/or modes.

For example, the shared memory 230 may comprise a separate shared memory 230A implemented, deployed and/or included in one or more networked storage resources which are separate from the computing devices 202, for example, a server, a memory array, and/or the like. While separated from the computing devices 202, the separate shared memory 230A may be accessible, via the network 206, to the DB update limiter 222 executed by all computing devices 202 executing applications 220 capable of updating the database(s) 204. In another example, the shared memory 230 may comprise a local shared memory 230B implemented in a local memory of one or more of the computing devices 202 which is also accessible, via the network 206, to the DB update limiter 222 executed by all computing devices 202 executing applications 220 capable of updating the database(s) 204. In another example, the shared memory 230 may be utilized through one or more messaging tools, applications, infrastructures, and/or the like configured to enable handshaking and/or data exchange between applications, for example, Redis, and/or the like.

Optionally, one or more of the computing devices 202 and their executed applications 220 may be utilized by one or more cloud computing services, platforms and/or infrastructures, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like. In such embodiments, one or more, and typically a plurality of client devices and/or computing devices such as the computing devices 202 serving as clients may communicate, via a network such as the network 206, with the applications 220 which are actually executed by the cloud service(s).

Moreover, in such cloud based embodiments, the shared memory 230 may be implemented and/or utilized using one or more cloud resource, for example, a cloud storage, a cloud service and/or the like 2 which is accessible to all applications 220 executed at the cloud.

Complementary, the DB update limiter 222 may be configured and/or adapted according to the implementation of the shared memory 230 such that it may be capable of accessing the shared memory 230. For example, is implemented as implemented using separate code segment(s), the DB update limiter 222 may be configured to have access to the shared memory 230 and further be assigned with write privileges for manipulating contents of the shared memory 230. In another example, in case the DB update limiter 222 is embedded and/or integrate in one or more of the applications 220, these applications 220 may be configured to have access to the shared memory 230 and further be assigned with write privileges for manipulating contents of the shared memory 230.

For brevity, the process 100 is described for limiting concurrent accesses in a single database 240. This however, should not be construed as limiting since as may become apparent to a person skilled in the art, the process 100 may be scaled and/or repeated for a plurality of databases 204.

As shown at 102, the DB update limiter 222 executed by each computing device 202 may be initiated before each access made by each of one or more of the applications 220 executed by the respective computing device 202 to the database 204.

In particular, the DB update limiter 222 may be initiated before each update access made by the application(s) 220 to the database 204. This is because the lock mechanism of the database 204 is typically applied for update accesses (write cycles) rather than for fetch accesses (read cycles) since the integrity of the data stored in the database 204 may be compromised during multiple concurrent update accesses to the same data segment(s) of the database 204 but not during concurrent read accesses.

One or more techniques, modes and/or implementations as known in the art may be applied for initiating the DB update limiter 222 before update accesses made by the application(s) 220 to the database 204. For example, hooks to the DB update limiter 222 and/or code segment(s) of the DB update limiter 222 may be inserted in the program code of each application 220 before each database update access command, instruction, routine, function, and/or the like such that the DB update limiter 222 may be initiated before the respective update access to the database 204. In another example, one or more intermediate code files, for example, object file, archive file, library file and/or the like of one or more of the applications 220 may be analyzed, for example, parsed, and/or the like to identify update accesses to the database 204 and insert a hook and/or the code segment(s) of the DB update limiter 222 to precede each update access. In another example, one or more executable files of one or more of the applications 220 may be analyzed, for example, decompiled, and/or the like to identify update accesses to the database 204 and insert a hook and/or the code segment(s) of the DB update limiter 222 to precede each update access.

As shown at 104, the DB update limiter 222 may identify a DB segment identifier (ID) of a destination segment of the database that is targeted by the respective update access, for example, a segment address, a segment number, a segment pointer, and/or the like.

The database 204 may be segmented to one or more segments, for example, a table, a row, an entry, a cell, a field, a key, a primary key, a table, and/or the like. Optionally, the database 204 may include the entire database 204 such that the database 204 comprises a single segment.

The database 204 may be segmented according to one or more schemes, granularities, structures and/or capabilities applicable for the database 204. For example, the database 204 may be segmented to one or more segments according to its locking mechanism granularity such the database 204 may be segmented to a plurality of segments which are the smallest data structures that may be locked in the database 204 for concurrent update accesses and thus the units of recovery (UR) of the database 204. For example, assuming the database 204 and/or a DBMS controlling the database 204 is capable of locking rows in the database 204 for concurrent updates (write cycles), the plurality of segments of the database 204 may correspond to rows. In another example, assuming the database 204 and/or a DBMS controlling the database 204 is capable of locking only complete tables for concurrent updates (write cycles), the plurality of segments of the database 204 may correspond to tables.

The DB update limiter 222 may apply one or more methods, techniques and/or implementations to identify the DB segment ID of the destination segment targeted by each update access. For example, in case hooks are inserted in one or more of the applications to initiate the DB update limiter 222 prior to each update access to the database 204, the ID of the destination segment targeted (to be accessed) by the respective update access may be transferred to the DB update limiter 222 via a variable, an argument, and/or the like as known in the art. In another example, the DB update limiter 222 may extract the ID of the destination segment from one or more update accesses before the respective update access(s) are actually executed.

As shown at 106, the DB update limiter 222 may check an access counter associated with the DB segment ID of the destination segment identified by the DB update limiter 222 for each update access.

Each segment of the database 204 may be associated with a respective access counter indicative of a number of update accesses that are currently in progress to the respective segment. The counter associated with one or more of the segments may store, log and/or record each update access to the respective segment and may therefore accurately reflect the exact number of update accesses currently in progress to the respective segment. However, rather than reflecting an accurate number, the counter associated with one or more of the segments may be indicative of a scope, volume, and/or order of magnitude of update accesses which are currently in progress to the respective segment.

Since the segments typically correspond to the smallest lockable data structure in the database 204, each segment may be associated with its unique access counter that is indicative of the number of update accesses that are currently in progress to the respective segment, i.e., the number of current concurrent update accesses.

The access counters associated with the segments of the database 204 may be stored and/or served in the shared memory 230 and may be therefore accessible to the DB update limiter 222 executed by each of the computing devices 202 that also executes one or more applications 220 capable of accessing and updating the database 204.

A shown at 108, which is a conditional step, in case the access counter, i.e., the number of current concurrent update access to the destination segment targeted by the respective does not exceed, i.e., is smaller than a certain threshold, the process 100 may branch to 110 to enable the respective update access. However, in case the access counter equals and/or exceeds the certain threshold, the process 100 may branch to 120 to block the respective update access.

The value of the certain threshold may be set, selected, defined and/or adjusted according to one or more operational parameters of the database 204. For example, the certain threshold may be set to prevent overload of the locking mechanism of the database 204 and thus avoid performance degradation of the database 204. The certain threshold may be therefore adjusted according to the locking capabilities of each database 204 and/or of the DBMS controlling it. For example, the certain threshold may be set to a value between 30 and 50 concurrent update accesses to each segment of the database 204. In another example, the certain threshold may be set according to an architecture of the database 204, for example, size of the database 204, number of segments of the database 204, and/or the like. In another example, the certain threshold may be set according to criticality of the data stored in the database 204.

Optionally, the certain threshold may be dynamically adjusted according to one or more database traffic and/or access characteristics identified in real-time. For example, the certain threshold may be reduced per segment in case a large number of different segments of the database 204 are accessed concurrently to update their data. Since the database 204 and its locking mechanism may need to monitor and control a very large overall number of concurrent update accesses to multiple segments of the database 204, reducing the certain threshold may reduce the overall number of concurrent update accesses and may thus prevent overload of the locking mechanism. In contrast, in case only a very few different segments are concurrently accessed for data update, the certain threshold may be increased per segment since the database 204 and its locking mechanism that need to control concurrent access to very few segments may be capable to handle an increased number of concurrent update accesses to each segment.

Moreover, the certain threshold may be adjusted according to one or more parameters relating to one or more of the computing devices 202. One or more of the applications 220 and/or one or more users using the computing devices 202. For example, the certain threshold may be increased for one or more high demand segments of the database 204 which may store data that is highly and/or widely used by multiple applications 220 and may be therefore accessed more frequently and/or at higher rate. In another example, the certain threshold may be increased for one or more segments storing data relating to one or more high priority accounts (e.g. high-end subscription account, premium account, etc.) associated with one or more of the computing devices 202 and/or their users. In another example, the certain threshold may be increased for one or more segments storing data which is frequently used by critical applications 220, for example, essential communication applications, life-saving monitor and/or control applications and/or the like.

As shown at 110, since the number of concurrent update accesses that are currently in progress to the destination segment of the receptive update access does not exceed the certain threshold, the DB update limiter 222 may enable the respective update access to its destination segment in the database 204. This means that responsive to determining that the number of currently in progress update accesses to the destination segment indicated by the counter associated with the destination segment does not exceed the certain threshold, the DB update limiter 222 may enable the respective update access to the destination segment.

However, before actually enabling the respective update access to be carried out for updating data in the destination segment, the DB update limiter 222 may first update the access counter associated with the destination segment. In particular, the DB update limiter 222 may increment the value of the access counter to reflect the respective update access.

The step 110 may be executed for each update access to the destination segment that is enabled by the DB update limiter 222. In such case, the counter associated with the destination segment may express the precise number of update accesses currently in progress to the destination segment.

However, since a write cycle to increment the access counter may be time consuming, rather than incrementing the value of the access counter on every update access to the associated segment, the DB update limiter 222 may update, i.e., increment and decrement the (value of) access counter only every certain number of update accesses to the same segment associated with the access counter. In such operation mode, the counter associated with the destination segment may express only an indication, of a scope, volume, order of magnitude and/or the like of the number of update accesses currently in progress to the destination segment.

The certain number of update accesses after which the access counter may be updated (increased and decreased) may be set, defined and/or adjusted according to one or more operational parameters of the database 204. In particular, the certain number of update accesses may be set to prevent impacting and overloading locking mechanism of the database 204. In particular, this statistical counter update, i.e., update of the access counters only every certain number of consecutive update accesses may not be significantly impact the locking mechanism since the locking mechanism is typically not susceptible to small fluctuations in the number of concurrent update accesses to its segments. For example, the certain number of update accesses may be set to 10, 15, 20 and/or the like consecutive accesses to the same segment of the database 204 after which the DB update limiter will update the access counter associated with the respective segment.

Optionally, the certain number defined for the updating the DB update limiter 222 to update the counter associated with the destination segment, i.e., increment and subsequently decrement the counter, may be selected using one or more random number generators, for example, a pseudo-random number generator. For example, according to a randomly selected certain number, the DB update limiter 222 may update the counter of the destination segment for only 20% of updater accesses to the destination segment. In another example, according to a randomly selected certain number, the DB update limiter 222 may update the counter of the destination segment only every 10 update accesses to the destination segment.

In yet another example, the certain number may be selected according to a probability rate indicating a frequency of updating the access counter associated with the destination segment, i.e., incrementing and subsequently decrementing it, for a group of update accesses. For example, the probability rate may define that the access counter should be updated during 1 in 5 of update accesses, during 1 in 10 of update accesses, during 1 in 100 of update accesses, and/or the like optionally depending on sensitivity of the segment. As such, the DB update limiter 222 may randomly select the certain number according to the predetermined probability and update the counter of the destination segment accordingly. In this manner, if error results with peaks of requests in fixed intervals, the DB update limiter 222 may detect such conditions. The DB update limiter 222 may optionally adjust accordingly. For example, in case of update accesses overload to the destination segment, the DB update limiter 222 may increase the probability rate (increase updates of the counter) to increase locking of the destination segment and reduce probability of a database crash. In contrast the DB update limiter 222 may reduce the probability rate (reduce updates of the counter) to avoid overloading the counter.

As shown at 112, the DB update limiter 222 may enable the respective update access. This means that the DB update limiter 222 may transfer control back to the application 220 which initiated the respective update access to the database 204.

As shown at 114, the application 220 may execute (conduct, carry out, etc.) the respective update access to the database 204.

As shown at 116, after the update access to the destination segment is complete, the DB update limiter 222 may decrement the (value of) access counter associated with the destination segment.

In order to correctly maintain the access counter of each of the segments of the database 204, decrementing the access counters associated with segment targeted by update accesses must be correlated and synchronized with incrementing these access counters. Therefore, in case the DB update limiter 222 is configured to increment the access counter associated with the destination segment before enabling each update access, the DB update limiter 222 may be configured accordingly to decrement the access counter after completion of each update access to the associated destination segment. However, in case the DB update limiter 222 is configured to increment the access counter associated with the destination segment only before the first update access of a certain number of consecutive update accesses to the associated segment, the DB update limiter 222 may be configured accordingly to decrement the access counter after completion of the last of the certain number of consecutive update accesses to the associated segment.

Moreover, as known in the art, while some update accesses to the database 204 may be done out of transaction, most update accesses to the database 204 may be typically in transaction, i.e., part of a database transaction made by one or more of the applications 220 which may include multiple update accesses to one or more segments in the database 204.

For out of transaction update access, the DB update limiter 222 may be therefore configured to decrement the access counter (value) after the respective update access is executed. However, for in transaction update access, the DB update limiter 222 may decrement the access counter (value) only after completion of the transaction comprising the respective update access, for example, commit, roll-back, and/or the like.

This means that in case the respective update access is part of a transaction that has not completed yet, the DB update limiter 222 may not decrement the access counter associated with the destination segment after the respective update access is executed. Rather, the DB update limiter 222 may wait for completion of the transaction, for example, commit, roll-back, abort, and/or the like and only after transaction completes, the DB update limiter 222 may decrement the access counter associated with the destination segment updated by the update access of the transaction including the respective update access.

As shown at 118, a success indication, for example, message, string and/or the like may be returned by the DB update limiter 222 and/or by the application 220 to indicate that the respective update access was conducted successfully to update data in the destination segment of the database 204.

As shown at 120, since the number of concurrent update accesses that are currently in progress to the destination segment of the receptive update access equals or exceeds the certain threshold, the DB update limiter 222 may prevent (block) the respective update access from accessing its destination segment in the database 204. This means that responsive to determining that the number of currently in progress update accesses to the destination segment indicated by the counter associated with the destination segment is equal or exceeds the certain threshold, the DB update limiter 222 may prevent the respective update access to the destination segment.

As shown at 122, the DB update limiter 222 may return an error to the application 220 which initiated the respective update access, for example, a message, a string and/or the like to indicate that the respective update access failed, i.e., prevented, blocked and thus not carried out.

In response to the error, the initiating application 220 may retry the update access at a later time and may eventually succeed to execute it assuming the number of concurrent update accesses to the destination segment at the later time will not exceed (i.e., be smaller than) the certain threshold.

Figure 3:
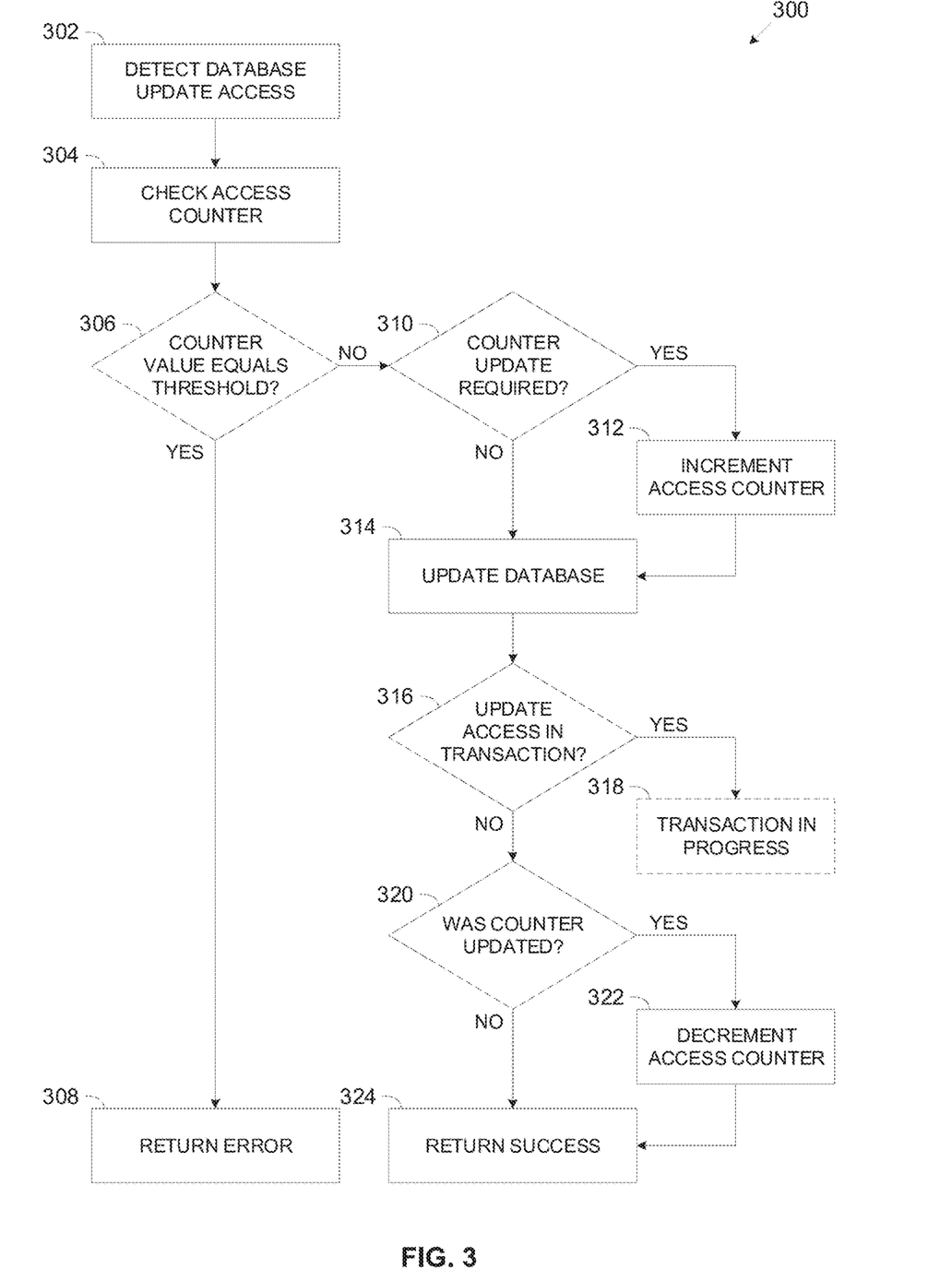
FIG. 3 is a flowchart of an exemplary process of limiting concurrent updates in a database which are in or out of transaction, according to some embodiments of the present invention.

Reference is now made to FIG. 3, which is a flowchart of an exemplary process of limiting concurrent updates in a database which are in or out of transaction, according to some embodiments of the present invention.

An exemplary process 300 which is a more detailed version of the process 100 may be executed by a DB update limiter such as the DB update limiter 222 executed at the application level of a plurality of applications such as the applications 220 executed by one or more computing devices such as the computing device 202 which are capable of accessing and updating data in one or more databases such as the database 204.

As shown at 302, each update access executed by each of the applications 220 to a destination segment in the database 204 may be detected as described in step 102 of the process 100.

As shown at 304, the DB update limiter 222 may identify the destination segment of the respective update access as described in step 104 of the process 100 and may check the access counter associated with the destination segment as described in step 106 of the process 100.

As shown at 306 which corresponds to conditional step 108 of the process 100, in case the access counter equals and/or exceeds the certain threshold, the process 300 may branch to 308 while otherwise the process 300 may branch to 310 since the access counter (value) does not exceed, i.e., is smaller than the certain threshold.

As shown at 308, the DB update limiter 222 may prevent execution of the respective update access as described in step 120 of the process 100 and may further return an error as described ion step 122 of the process 100 to indicate that the respective update access failed since it was prevented (blocked) and thus not executed.

As shown at 310, the DB update limiter 222 may check whether the access counter needs to be updated, i.e., its value incremented. For example, in case the DB update limiter 222 is configured to increment and decrement the access counter per each update access, the DB update limiter 222 may determine that the access counter needs to be incremented. In another example, in case statistical counter update is applied, the DB update limiter 222 may check how many update accesses were made to the destination segment of the respective update access since the most recent update of the access counter associated with the destination segment. In case the number of update accesses made to the destination segment exceeds the defined certain number of update accesses, the DB update limiter 222 may branch to 312 to update the access counter associated with the destination segment. Otherwise, the DB update limiter 222 may branch to 314 without updating the associated access counter.

As shown at 312, the DB update limiter 222 may increment the associated access counter.

As shown at 314, the respective update access may be executed (carried out) to update data in the destination segment.

As shown at 316, the DB update limiter 222 may check whether the respective update access is in transaction, i.e., whether the respective update access is part of a database transaction which may comprise additional update accesses to one or more segments of the database 204.

As shown at 318, since the respective update access is in transaction, i.e., part of a transaction, the DB update limiter 222 may wait until the transaction is complete, for example, until a commit or a roll-back concluding the transaction, before proceeding to 320.

As shown at 320, after execution of the respective update access which is out of transaction or after completion of the transaction comprising the respective update access which is in transaction, the DB update limiter 222 may check whether the access counter associated with the destination segment of the respective update access was updated and incremented prior to the respective update access (step 310).

As shown at 322, in case the access counter associated with the destination segment of the respective update access was incremented before the respective update access (step 312), the DB update limiter 222 may decrement the associated access counter.

As shown at 324, the DB update limiter 222 may return a success as described in step 118 of the process 100 to indicate the respective update access completed successfully.

Figure 4A:
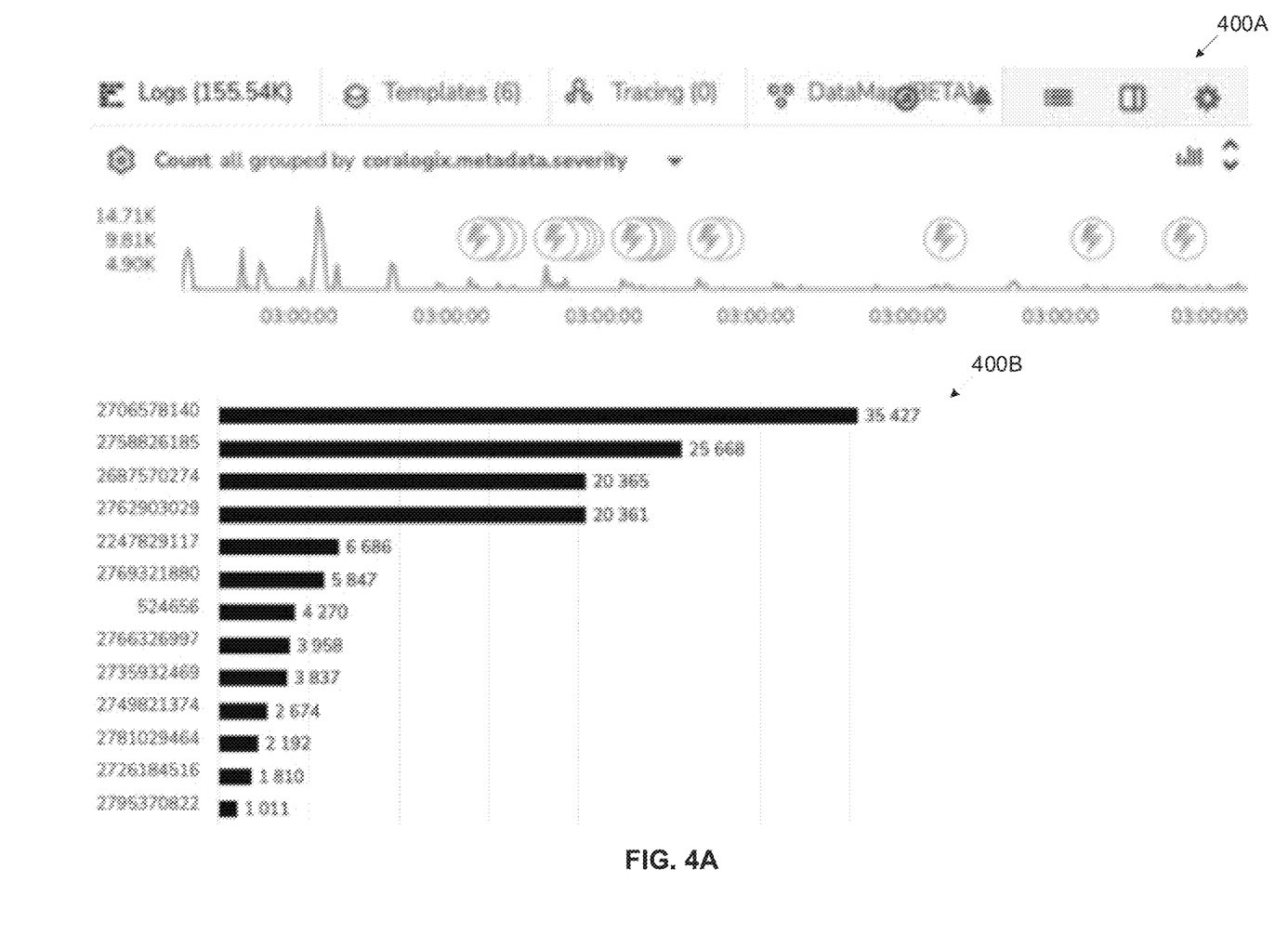
FIG. 4A and FIG. 4B are graph charts and tables of results of experiments demonstrating improvement of database performance due to concurrent update limitation, according to some embodiments of the present invention.
Figure 4B:
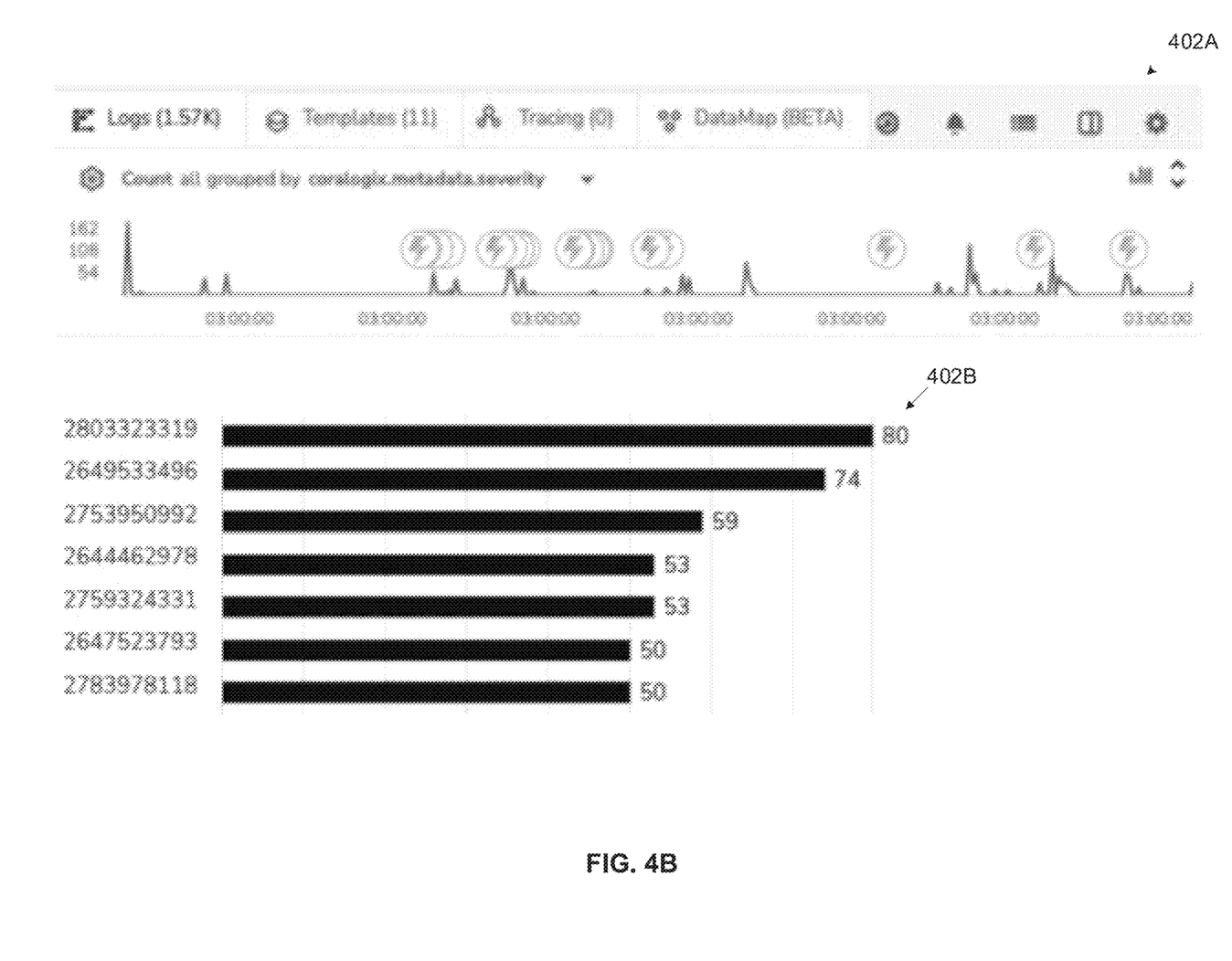

Reference is now made to FIG. 4A and FIG. 4B, which are graph charts and tables of results of experiments demonstrating improvement of database performance due to concurrent update limitation, according to some embodiments of the present invention.

FIG. 4A presents distribution of overload events in a database such as the database 204, specifically, a large monolith database comprising a plurality of SQL tables accessed over a period of 14 days by a plurality of applications such as the applications 220 for updating data in the tables.

As shown at 400A and 400B, during the 14-day period a total of 155,540 update accesses to the database were blocked by preventing more than 1,000 concurrent updates to concurrently update any single row (i.e., the threshold set to 1,000) which prevented at least 13 major overload incidents. Moreover, more than 100 medium overload incidents were prevented during the 14-day period by preventing more than 100 concurrent updates per any single row (i.e., the threshold set to 100).

FIG. 4B presents distribution of overload events in a database such as the database 204, specifically, a relatively small microservice based database comprising a single SQL table that is characterized by high load and relatively slow update cycles accessed over a period of 14 days by a plurality of applications such as the applications 220 for updating the table.

As shown at 402A and 402B, during the 14-day period a total of 1,570 update accesses to the database were prevented (blocked) by preventing more than 40-50 concurrent updates to concurrently update any single row (i.e., the threshold set to 40-which prevented about 10 medium overload incidents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term database architecture is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of limiting concurrent updates in a database, comprising:
   executing a Data Base (DB) update limiter by at least one processor of each of a plurality of computing devices, wherein each of the plurality of computing devices executing at least one application capable of updating data in at least one database which is accessible by a plurality of applications executed by the plurality of computing devices, the at least one processor is adapted for executing said DB update limiter which controls concurrent accesses to said at least one database and configured for:
   executing the following for each update access of the at least one application to the at least one database:
   identifying a DB segment identifier of a destination segment of the database targeted by the respective update access;
   checking an access counter associated with the identified DB segment identifier, the counter is indicative of a number of update accesses currently in progress to the destination segment, wherein said access counter is stored in at least one shared memory resource accessible to the DB update limiter executed by each of the plurality of computing devices;
   enabling the respective update access responsive to determining that the access counter is smaller than a certain threshold; and
   preventing the respective update access responsive to determining that the access counter equals the certain threshold.

2. The method of claim 1, wherein the DB update limiter is configured to increment the access counter in case the respective update access is enabled and decrementing the access counter after the respective update access completes.

3. The method of claim 2, wherein the DB update limiter is configured to increment and decrement the access counter every certain number of enabled update accesses to the associated segment.

4. The method of claim 3, wherein the certain number is selected according to a probability rate indicating a frequency of incrementing and subsequently decrementing the access counter for a group of update accesses.

5. The method of claim 2, wherein the DB update limiter is configured to decrement the access counter after completion of a transaction comprising the respective update access.

6. The method of claim 1, wherein the DB update limiter is further configured to return an error in case the respective update access is blocked.

7. The method of claim 1, wherein a single DB update limiter executed by the computing device is hooked to each application executed by the computing device which is capable of updating the at least one database.

8. The method of claim 1, wherein the DB update limiter is embedded in each of the plurality of applications capable of updating the at least one database.

9. The method of claim 1, further comprising adjusting the certain threshold according to at least one parameter of the computing device, the at least one application, and/or a user of the computing device.

10. The method of claim 1, wherein each segment of the database comprises at least one member of a group consisting of: a table, a row, an entry, a cell, a field, a key, a primary key, a table, and the entire at least one database.

11. A system for limiting concurrent updates in a database, comprising
   at least one processor of each of a plurality of computing devices, each of the plurality of computing devices executing at least one application capable of updating data in at least one database which is accessible by a plurality of applications executed by the plurality of computing devices, the at least one processor is adapted for executing a program code of a DB update limiter which controls concurrent accesses to said at least one database, the program code comprising:

code instructions to execute the following for each update access of the at least one application to the at least one database:
identify a DB segment identifier of a destination segment of the database targeted by the respective update access;
check an access counter associated with the identified DB segment identifier, the counter is indicative of a number of update accesses currently in progress to the destination segment, wherein said access counter is stored in at least one shared memory resource accessible to the DB update limiter executed by each of the plurality of computing devices;
enable the respective update access responsive to determining that the access counter is smaller than a certain threshold; and
prevent the respective update access responsive to determining that the access counter equals the certain threshold.

12. The system of claim 11, wherein the DB update limiter is configured to increment the access counter in case the respective update access is enabled and decrementing the access counter after the respective update access completes.

13. The system of claim 12, wherein the DB update limiter is configured to increment and decrement the access counter every certain number of enabled update accesses to the associated segment.

14. The system of claim 13, wherein the certain number is selected according to a probability rate indicating a frequency of incrementing and subsequently decrementing the access counter for a group of update accesses.

15. The system of claim 12, wherein the DB update limiter is configured to decrement the access counter after completion of a transaction comprising the respective update access.

16. The system of claim 11, wherein the DB update limiter is further configured to issue an error in case the respective update access is blocked.

17. The system of claim 11, further comprising adjusting the certain threshold according to at least one parameter of the computing device, the at least one application, and/or a user of the computing device.

18. The system of claim 11, wherein each segment of the database comprises at least one member of a group consisting of: a table, a row, an entry, a cell, a field, a key, a primary key, a table, and the entire at least one database.

* * * * *